United States Patent [19]

Maytum

[11] Patent Number: 4,590,548

[45] Date of Patent: May 20, 1986

[54] A.C. SUPPLY CONVERTER

[75] Inventor: Michael J. Maytum, Willington, England

[73] Assignee: Texas Instruments Incorporated, Dallas, Tex.

[21] Appl. No.: 597,787

[22] Filed: Apr. 6, 1984

[30] Foreign Application Priority Data

Apr. 6, 1983 [GB] United Kingdom ................ 8309303

[51] Int. Cl.$^4$ .......................................... H02M 5/257
[52] U.S. Cl. ...................................... 363/161; 363/164; 363/165
[58] Field of Search .................... 363/1, 8, 9, 10, 159, 363/160, 161, 163, 164, 165, 41, 148, 149; 307/3

[56] References Cited

U.S. PATENT DOCUMENTS 4,225,914  9/1980  Hirata et al. ........................ 363/160
4,468,725  8/1984  Venturini ............................ 363/160

*Primary Examiner*—Peter S. Wong
*Assistant Examiner*—Judson H. Jones
*Attorney, Agent, or Firm*—Mel Sharp; N. Rhys Merrett

[57] ABSTRACT

A direct a.c. supply converter for converting an N ($\geq 2$) phase input voltage system into an a.c. output voltage system of different frequency, amplitude, and/or phase using width-modulated contributions from the phases of the input voltage system to produce the output voltage system suffers from the disadvantage that the maximum output voltage amplitude can be limited to the minimum instantaneous voltage of the input voltage system because of the arbitrary timing relationship between the two voltage systems. This limitation is relieved by the addition of a component at the $N^{th}$ harmonic of the input system frequency to the width-modulation so that the effective minimum instantaneous voltage of the input system is increased. An increase in the maximum output voltage amplitude can also be obtained by adding to the width-modulation a component at the $P^{th}$ harmonic of the output system frequency; this can be used along or in conjunction with the component at the $N^{th}$ harmonic of the input system frequency.

13 Claims, 6 Drawing Figures

A.C. SUPPLY CONVERTER

This invention relates to a direct a.c. supply converter for converting a polyphase input voltage system to an a.c. output voltage system having at least one characteristic such as frequency, amplitude, phase angle or phase displacement which is different from that of the input voltage system.

Related systems are disclosed in U.S. Pat. Nos. 4,468,725 and 4,536,835 both assigned to Texas Instruments Incorporated.

U.S. patent application Ser. No. 390,000 filed June 18, 1982, (issued as U.S. Pat. No. 4,468,725 on Aug. 29, 1984) incorporated herein by reference relates to a direct a.c. converter which an array of bidirectional switches which individually connect each input phase to the or each output phase are each controlled by a repeating sequence of mutually abutting width modulated pulses having as many pulses in the sequence as there are phases in the input voltage system so that the switches are closed to connect each phase of the input voltage system in turn to the or each phase of the output voltage system and at any given instant only one of the switches connected to the or each output conductor is closed. In practice, the operation of the switches is such as to synthesise the waveforms of the output voltage system from samples of the different phases of the input voltage system. It will be apparent that since only switches are involved in the transfer of power from the input system to the output system, the impedance of the converter is very low. This however brings with it the disadvantage that because of the possibly random relationship between the input and output voltage systems the peak amplitude of the output voltage is limited to the minimum instantaneous voltage of the input voltage system. In the case of a three-phase input voltage system the minimum instantaneous voltage is one-half of the peak voltage with the result that the peak output voltage is one-half of the peak input voltage and for a given load the maximum output power is one-quarter of that obtainable from the input voltage system.

It is an object of the present invention to provide an improved direct a.c. converter of the kind just described in which an output voltage system of larger amplitude than the minimum instantaneous voltage of the input voltage system can be obtained.

According to one aspect of the present invention there is provided a direct a.c. converter having N input conductors for an N-phase a.c. input voltage system, where N is an odd integer greater than 2, one or more output conductors for carrying respective phases of an a.c. output voltage system having at least one characteristic such as frequency, amplitude, phase angle or phase displacement which is different from that of the input voltage system, a plurality of bidirectional switches which individually connect each input conductor to the or each output conductor, and a control system including timing means which produces for the or each output conductor a repeating sequence of mutually abutting width modulated pulses, there being N pulses in the sequence respectively allocated to the phases of the input voltage system, the control system being connected to the switches so that the pulses cause the switches to be closed in such a way that each phase of the input voltage system is connected in turn to the or each phase of the output voltage system and that at any given instant only one of the switches connected to the or each output conductor is closed, wherein the width modulation of the pulses includes a component at the $N^{th}$ harmonic of the input voltage frequency which is of such an amplitude and so phased as to permit the amplitude of the output voltage system to be larger than the minimum instantaneous voltage of the input voltage system.

According to a second aspect of the present invention there is provided a direct a.c. converter having N input conductors for an N-phase a.c. input voltage system, P output conductors for carrying respective phases of a polyphase a.c. output voltage system having at least one characteristic such as frequency, amplitude, phase angle or phase displacement which is different from that of the input voltage system, where P is an odd integer greater than 2, a plurality of bidirectional switches which individually connect each input conductor to each output conductor, and a control system including timing means which produces for each output conductor a repeating sequence of mutually abutting width modulated pulses, there being N pulses in the sequence respectively allocated to the phases of the input voltage system, the control system being connected to the switches so that the pulses cause the switches to be closed in such a way that each phase of the input voltage system is connected in turn to each phase of the output voltage system and that at any given instant only one of the switches connected to each output conductor is closed, wherein the width modulation of the pulses includes a component at the $P^{th}$ harmonic of the output voltage frequency which is of such an amplitude and so phased as to permit the amplitude of the output voltage system to be larger than the minimum instantaneous voltage of the input voltage system.

According to a third aspect of the present invention there is provided a direct a.c. converter having N input conductors for an N-phase a.c. input voltage system, where N is an odd integer greater than 2, P output conductors for carrying respective phases of a polyphase a.c. output voltage system having at least one characteristic such as frequency, amplitude, phase angle, or phase displacement which is different from that of the input voltage system, where P is an odd integer greater than 2, a plurality of bidirectional switches which individually connect each input conductor to each output conductor, and a control system including timing means which produces for each output conductor a repeating sequence of mutually abutting width modulated pulses, there being N pulses in the sequence respectively allocated to the phases of the input voltage system, the control system being connected to the switches so that the pulses cause the switches to be closed in such a way that each phase of the input voltage system is connected in turn to each phase of the output voltage system and that at any given instant only one of the switches connected to each output conductor is closed, wherein the width modulation of the pulses includes components at the $N^{th}$ harmonic of the input voltage frequency and the $P^{th}$ harmonic of the output voltage frequency, the components being of such amplitudes and so phased as to permit the amplitude of the output voltage system to be larger than the minimum instantaneous voltage of the input voltage system In a particular example of the invention both input and output voltage systems are three-phase systems so that the width modulation includes a component at the third harmonic of the input voltage frequency and/or the third harmonic of the output voltage frequency. A suitable amplitude for the third harmonic of the input voltage frequency is 0.25 $V_i$, where $V_i$ is the amplitude of the input voltage system. This enables the output voltage system to have an amplitude of 0.75 $V_i$ provided that it is correctly phased relative to the input voltage system.

If the width modulation of the pulses includes a component at the third harmonic of the output voltage frequency without a component at the third harmonic of the input voltage frequency, this will permit an increase in the amplitude of the output voltage from 0.5 $V_i$ to 0.58 $V_i$.

In order that the invention may be fully understood and readily carried into effect it will no be described with reference to the accompanying drawings, of which:

FIG. 1 is a diagram of one example of a converter as disclosed in specification of British Patent Application No. 80.06636 (as well as in U.S. Pat. No. 4,468,725) adapted in accordance with the present invention;

Figure 1:
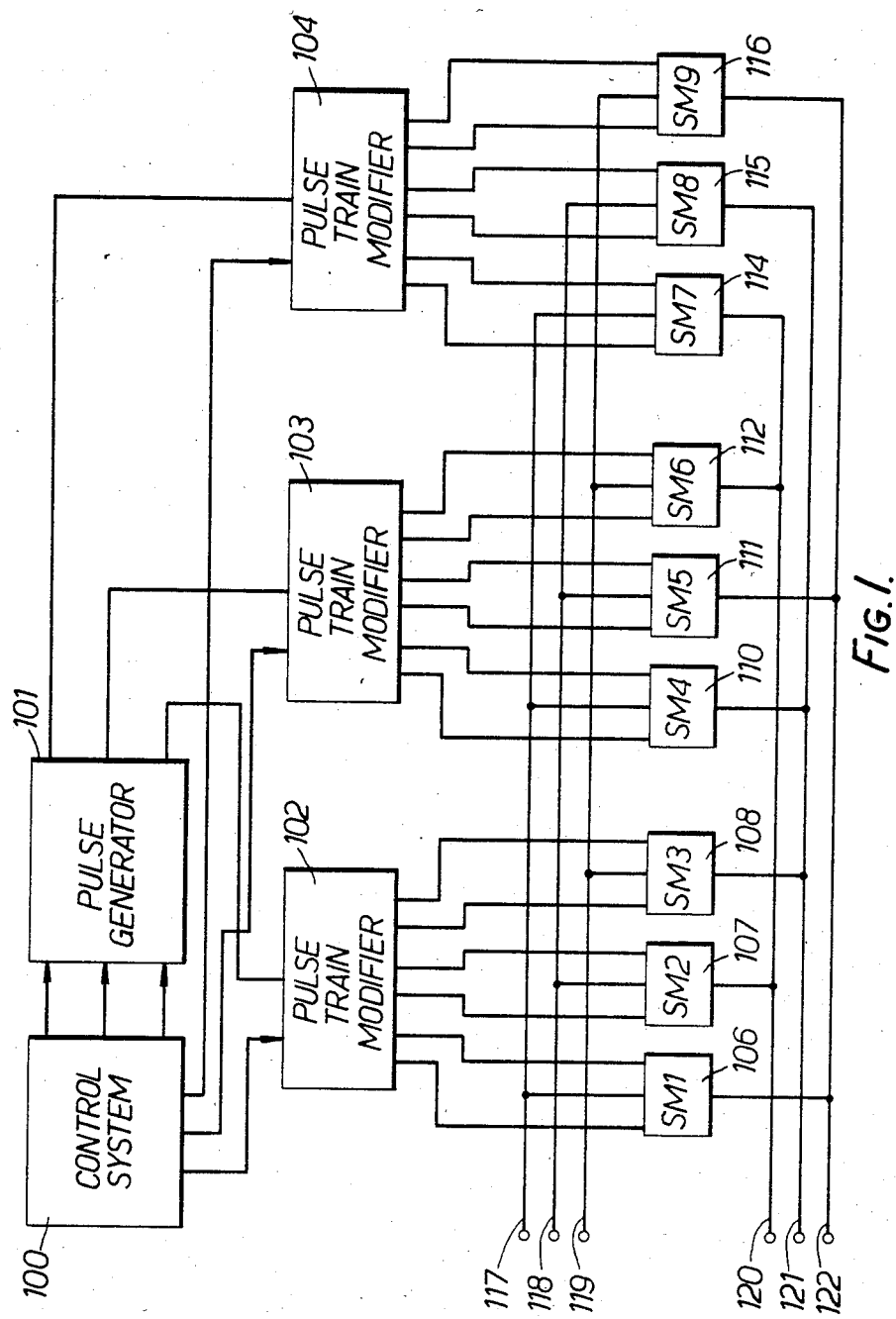

FIG. 1 shows in diagrammatic form one example of the type of converter described in co-pending British Patent Application No. 80.06636 (as well as U.S. Pat. No. 4,468,725) for converting a three-phase input a.c. voltage system into a three-phase output a.c. voltage system modified to operate according to the invention. The converter described in the above patent application can have an input a.c. voltage system of any number of phases greater than 3 and can produce an output a.c. voltage system having any number of phases. In FIG. 1, a control system 100 produces outputs defining the width modulation of three sequences of pulses in which each sequence contains three pulses. Typically, the mean PRF of the pulses in the sequences is from 5 to 10 kHz, although frequencies outside this range can also be used. The signals from the circuit 100 are applied to a pulse generator 101 which produces the width modulated pulses in the three sequences which are respectively applied to pulse train modifiers 102, 103 and 104. The modifiers 102, 103 and 104 are connected to receive from the control system 100 signals representing the third harmonic of the input system frequency and/or the third harmonic of the output system frequency with differing phase positions and supply controlling pulse trains to bidirectional switches 106, 107 and 108, 110, 111 and 113, 114, 115 and 116, in groups of three as shown. The three-phase input voltage system is applied via conductors 117, 118 and 119, and the three-phase output voltage system is obtained from conductors 120, 121 and 122. The nine bidirectional switches are individually connected from one of the input voltage system conductors to one of the output voltage system conductors. As described in the above patent specification, the width modulation which determines the conductive periods of the bidirectional switches is so arranged that the sinusoidal waveforms required on each of the three output voltage system conductors are built up from the input voltages available on the input voltage system. The third harmonic signal or signals modify the waveforms as described below. The mean PRF's of the pulses controlling the conductivity of the bidirectional switches is so much higher than the input and output voltage frequencies that good approximations to the required sinusoidal waveforms are obtained.

Figure 3:
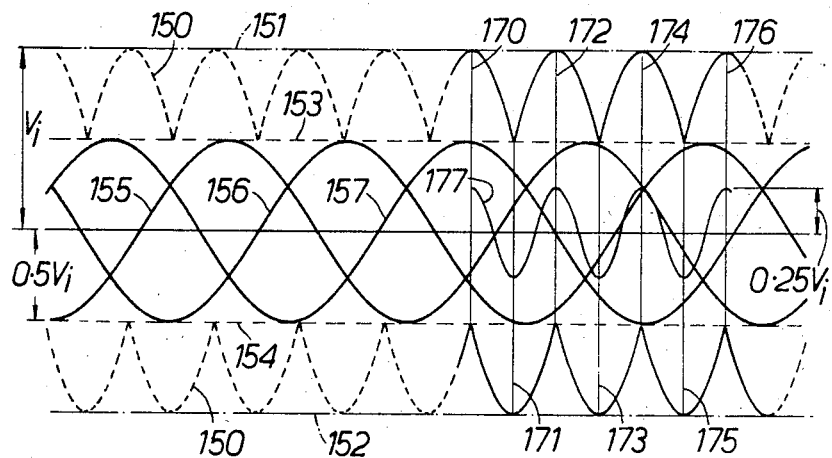
FIG. 3 is a diagram of waveforms within the converter shown in FIGS. 1 and 2 which will be used to illustrate an example of the present invention.

Referring now to FIG. 3, the left-hand side of this figure shows in dotted lines 150 the waveforms of the higher values of the three phases of the input voltage system. The amplitude of the input voltage system is $V_i$ which level is indicated by chain dotted lines 151 and 152. Since the three phases of the input voltage system are separated by 120° phase angle, it follows that the crossing points of the sinusoidal waveforms occur at $$V_i \sin 30° = 0.5 V_i$$

which levels are indicated by dashed lines 153 and 154. The three phases of an output voltage waveform are indicated by the three sine waves 155, 156 and 157. Since the timing of the output voltage waveform need not be related in any way to that of the input voltage waveforms, it follows that for the circuit of FIG. 1 to operate the maximum voltage permissible for the output voltage waveform is 0.5 $V_i$ since at any instant the voltage of each of the waveforms 155, 156 and 157 is constructed from the instantaneous values of the input voltage waveforms at the time.

Figure 2:
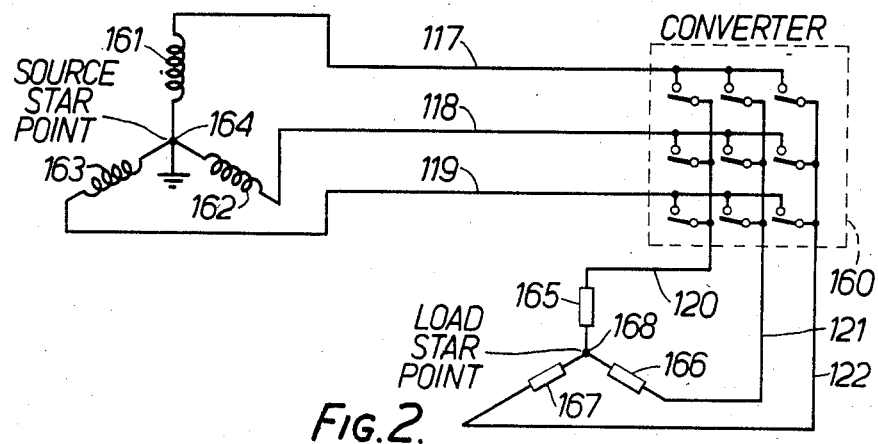
FIG. 2 is a simplified diagram of the converter of FIG. 1 showing its connection to a source and a load.

In FIG. 2, the converter shown in FIG. 1 is represented in diagrammatic form as nine switches within a dashed rectangle 160 with the three input voltage waveform conductors 117, 118 and 119 and the three output voltage waveform conductors 120, 121 and 122. It is assumed that the input voltage system is obtained from a three phase distribution transformer having secondary windings 161, 162 and 163 connected to a source star point 164 which is connected to earth. The load is assumed to consist of three components 165, 166 and 167 respectively connected from the conductors 120, 121 and 122 to a load star point 168. Although the load may not appear in this form, the presence of a virtual star point can be assumed.

With both the source and load star points 164 and 168 connected to earth, the limitations just described with reference to FIG. 3 are imposed on the converter shown in FIG. 1. However, if the load star point 168 is permitted to float and to move at three times the frequency of the input voltage system, the voltage applied to the maximum load can be increased from 0.5 $V_i$ to 0.75 $V_i$. Consider the right-hand side of FIG. 3 where the waveforms of the input voltage system are drawn as solid lines. The straight lines 170 to 176 join the peak values of one phase to the simultaneously occurring crossover of the voltages of the other two phases. It will be clear that the voltage difference represented by these straight lines is 1.5 $V_i$ and in accordance with this example of the invention the control of the nine bidirectional switches of the converter is modified so as to permit the load star point 168 (FIG.2) to float at three times the input voltage frequency with an amplitude of 0.25 $V_i$. This is indicated by the waveform 177 of FIG. 3. It will be apparent that relative to the waveform 177 a voltage range of at least 0.75 $V_i$ is available in both positive and negative senses at any instant.

Figure 4:
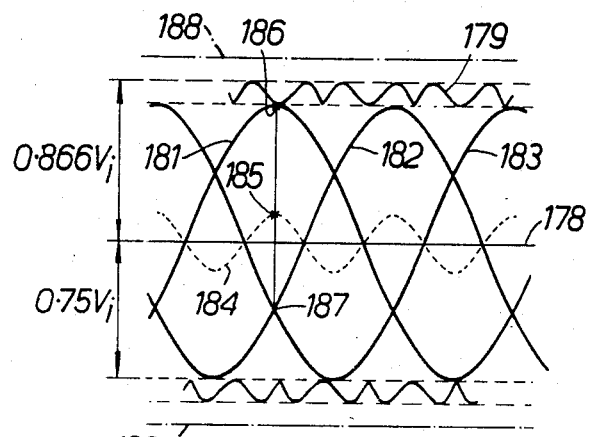
FIG. 4 is a diagram of waveforms within the converter of FIGS. 1 and 2 incorporating the one example of the present invention.
Figure 5:
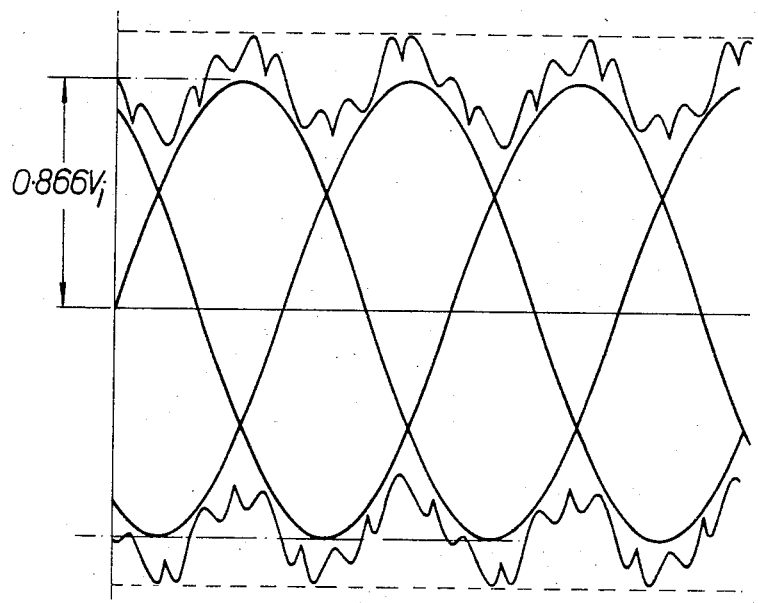
FIG. 5 is a diagram of the waveforms within the converter of FIGS. 1 and 2 incorporating another example of the present invention.

In FIG. 4, the central axis 178 corresponds to the waveform 177 of FIG. 3. As a result of the addition necessary to convert the waveform 177 into the straight line 178 the arches of the three sine waves representing the phases of the input voltage system are changed to the W-shaped waveforms 179 and 180. The output voltage waveforms are represented by the sine waves 181, 182 and 183 and clearly have a maximum possible amplitude of 0.75 $V_i$. A dotted sine wave 184 is of three times the frequency of the output voltage waveforms 181, 182 and 183 and is of such a phase that its peak/positive amplitude points such as 185 coincide in time with peak positive amplitudes of the respective three sine waves 181, 182, and 183 and with the negative crossovers of the other two sine waves. The function of the waveform 184 is explained below. The W-shaped waveforms 179 and 180 are of such amplitude that they extend from 0.75 $V_i$ to 0.866 $V_i$, and it is possible to increase further the maximum permissible amplitude of the output voltage system by adding to the waveforms 179 and 180 the sine waveform 184 of the optimum amplitude within the constraint on the maximum amplitude that the waveforms must lie within the extreme values of $+V_i$ and $-V_i$ as indicated by the chain dotted lines 188 and 189 in FIG. 4. The resultant waveforms are shown in FIG. 5. In practice, this means that the pulse width modulation for the converter is modified further by the addition of a component of amplitude 0.192 $V_o$ of three times the frequency of the output voltage system, where $V_o$ is the maximum amplitude of the output voltage system without the modification, i.e. 0.5 $V_i$ or 0.75 $V_i$. In this embodiment the load star point moves at three times the output voltage frequency as well as at three times the input voltage frequency.

Although the invention has been described with reference to a specific example in which a three-phase input voltage system is converted into a three-phase output voltage system, the invention can be used with any polyphase input voltage system having an odd number of phases, the component added to the pulse width modulation being the same multiple of the input voltage frequency as there are phases in the input voltage system, although the increase in the maximum output voltage is not so great as for a three-phase system. If only the component having a frequency which is a multiple of the input voltage frequency is added to the pulse width modulation of the converter, there is no restriction on the number of phases in the output voltage system. As described above, the maximum output voltage is increased from 0.5 $V_i$ to 0.75 $V_i$ by the addition of the component of three times the input voltage frequency and an amplitude of 0.25 $V_i$. For a five-phase system, the improvement is from about 0.8 $V_i$ to 0.9 $V_i$, the improvement becoming smaller with increase in the number of phases.

The improvement in the maximum output voltage amplitude obtained by adding the component of three times the output voltage frequency is also limited to the output voltage system being a polyphase system having an odd number of phases, and again the improvement possible becomes smaller with the increase in the number of phases.

It can be shown that provided that the movement of the load star point is symmetrical relative to the different phases of the output voltage system, as it is in the cases described above, substantially no energy is used by the movement and therefore the efficiency of the converter is not significantly reduced by the use of the invention.

As described above, the maximum values of the amplitudes of the harmonics of the input and/or output supply voltage frequencies are employed. It is not necessary to use the maximum values, and if desired the amplitudes of the harmonic(s) used may be matched to the magnitude of the output voltage required, so that only such amplitude of the or each harmonic as is needed is used.

In one embodiment of the invention the control system includes a digital computer programmed to generate the switch timing waveforms in a similar manner to that described in U.S. application Ser. No. 456,211 filed June 19, 1981, by P. J. Andrews and incorporated herein by reference.

The calculations implemented by the computer program for a converter for a three-phase input supply and a three-phase output are set out below:

SYMBOLS USED q = output/input voltage ratio
m = input/output voltage/current phase angle transfer multiplier
$g_i$ = load star point input frequency third harmonic voltage/input voltage ratio
$g_o$ = load star point output frequency third harmonic voltage/input voltage ratio
r = output/input frequency ratio
N = output voltage phase offset at time 0
$X_n$ = time at sampling instant n
$T_{seq} = X_{n+1} - X_n$ switch bank operating period.

Three optional functions are included to simplify the computer implementation.

ABS—absolute value
INT—integral part of
MOD—to the modulus

On the basis of the trigonometrical constraints certain limitations are placed on the values of the variables $$0 < q < 0.87$$

$$-1 < m < +1$$

$$g_i \leq 0.25$$

$$g_o \leq 0.14$$

$$0 < n < 120°$$

Some additional symbols are used for the values of the angular frequencies occurring in the system to simplify the expressions. These are the phasor frequencies of the components of the switch timings.

$$\left. \begin{array}{l} J_s = r - 1 \\ J_a = -(r + 1) \end{array} \right\} \text{output voltages}$$

$$\left. \begin{array}{l} K_s = 2 \\ K_a = -4 \end{array} \right\} \begin{array}{l} \text{star point voltages at} \\ 3 \times \text{input frequency} \end{array}$$

$$\left. \begin{array}{l} L_s = 3r - 1 \\ L_a = -(3r + 1) \end{array} \right\} \begin{array}{l} \text{star point voltages at} \\ 3 \times \text{output frequency} \end{array}$$

The switch timing components for the load voltage can then be expressed:

$$Q_s 1 = 1 + 2q \cos(\text{INT}(\text{ABS}(\omega_s + 0)) \text{ MOD } 360)$$

$$Q_s 2 = 1 + 2q \cos(\text{INT}(\text{ABS}(\omega_s - 120)) \text{ MOD } 360)$$

$$Q_s3 = 1 + 2q\cos(\text{INT}(\text{ABS}(\omega_s - 240))\text{ MOD } 360)$$

where $\omega_s = X_n \cdot J_s + N$ for positive phases sequence and rotation, or $$Q_a1 = 1 + 2q\cos(\text{INT}(\text{ABS}(\omega_a + 0))\text{ MOD } 360)$$

$$Q_a2 = 1 + 2q\cos(\text{INT}(\text{ABS}(\omega_a - 120))\text{ MOD } 360$$

$$Q_a3 = 1 + 2q\cos(\text{INT}(\text{ABS}(\omega_a - 240))\text{ MOD } 360L$$

where $$\omega_a = X_n \cdot J_a + N$$

for negative phase sequence and rotation.

The switch timing components for the star point voltage can be expressed $$P_{s1} = 2g_i\cos(\text{INT}(\text{ABS}(\omega_{1s} + 0\ 0))\text{ MOD } 360) - 2g_o\cos(\text{INT}(\text{ABS}(\omega_{2s} + 0))\text{ MOD } 360)$$

$$P_{s2} = 2g_i\cos(\text{INT}(\text{ABS}(\omega_{1s} - 120))\text{ MOD } 360) - 2g_o\cos(\text{INT}(\text{ABS}(\omega_{2s} - 120))\text{ MOD } 360)$$

$$P_{s3} = 2g_i\cos(\text{INT}(\text{ABS}(\omega_{1s} - 240))\text{ MOD } 360) - 2g_o\cos(\text{INT}(\text{ABS}(\omega_{2s} - 240))\text{ MOD } 360)$$

where $$\omega_{1s} = X_n \cdot K_s$$

and $$\omega_{2s} = X_n \cdot L_s + 3N$$

for positive phase sequence and rotation, or $$P_{a1} = 2g_i\cos(\text{INT}(\text{ABS}(\omega_{1a} + 0))\text{ MOD } 360) - 2g_o\cos(\text{INT}(\text{ABS}(\omega_{2a} + 0))\text{ MOD } 360)$$

$$P_{a2} = 2g_i\cos(\text{INT}(\text{ABS}(\omega_{1a} - 120))\text{ MOD } 360) - 2g_o\cos(\text{INT}(\text{ABS}(\omega_{2a} - 120))\text{ MOD } 360)$$

$$P_{a3} = 2g_i\cos(\text{INT}(\text{ABS}(\omega_{1a} - 240))\text{ MOD } 360) - 2g_o\cos(\text{INT}(\text{ABS}(\omega_{2a} - 240))\text{ MOD } 360)$$

where $$\omega_{1a} = X_n \cdot K_a$$

$$\omega_{2a} = X_n \cdot L_a + 3N$$

for negative phase sequence and rotation.

From these components the normalised switch timings are calculated as follows:

$$S1t = (1 + m)(Q_{S1} + P_{S1})/6 + (1 - m)(Q_{a1} + P_{a1})/6$$
$$S2t = (1 + m)(Q_{S2} + P_{S2})/6 + (1 - m)(Q_{a2} + P_{a2})/6$$
$$S3t = 1 - (S1t + S2t)$$

$$S4t = (1 + m)(Q_{S3} + P_{S1})/6 + (1 - m)(Q_{a2} + P_{a1})/6$$
$$S5t = (1 + m)(Q_{S1} + P_{S2})/6 + (1 - m)(Q_{a3} + P_{a2})/6$$
$$S6t = 1 - (S4t + S5t)$$

$$S7t = (1 + m)(Q_{S2} + P_{S1})/6 + (1 - m)(Q_{a3} + P_{a1})/6$$
$$S8t = (1 + m)(Q_{S3} + P_{S2})/6 + (1 - m)(Q_{q1} + P_{a2})/6$$
$$S9t = 1 - (S7t + S8t)$$

where Syt is the timing for switch y.

The actual switch timings are calculated from the above normalised values by multiplying each of them $T_{seq}$, the switch bank operating period. When the actual timing values have been calculated, signals of duration corresponding to the values are applied to the banks of switches feeding power to the load as described in U.S. application Ser. No. 390,000 filed June 18, 1982, or Ser. No. 456,211 filed July 1, 1983 both incorporated herein by reference.

Figure 6:
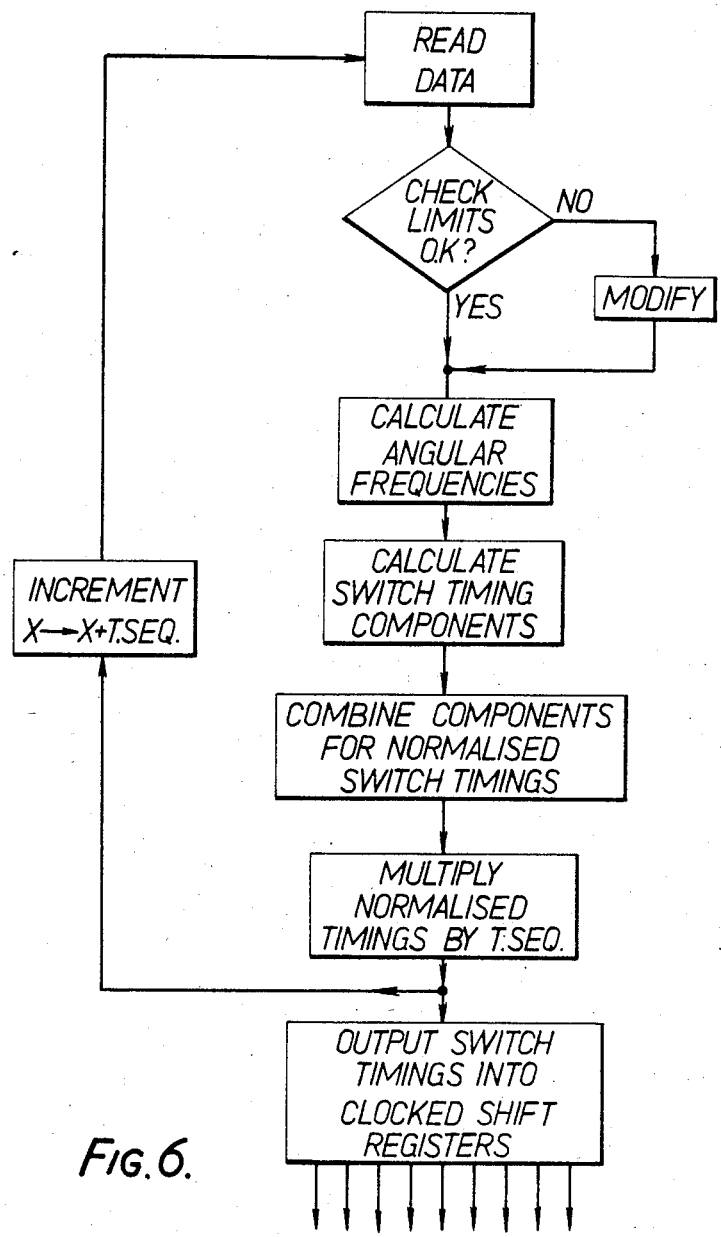

A flow diagram of one example of the computer is shown in FIG. 6.

What we claim is:

1. A direct a.c. converter having N input conductors for an N-phase a.c. input voltage system, where N is an odd integer greater than 2, one or more output conductors for carrying respective phases of an a.c. output voltage system having at least one characteristic such as frequency, amplitude, phase angle or phase displacement which is different from that of the input voltage system, a plurality of bidirectional switches which individually connect each input conductor to the or each output conductor, and a control system including timing means which produces for the or each output conductor a repeating sequence of mutually abutting width modulated pulses, there being N pulses in the sequence respectively allocated to the phases of the input voltage system, the control system being connected to the switches so that the pulses cause the switches to be closed in such a way that each phase of the input voltage system is connected in turn to the or each phase of the output voltage system and that at any given instant only one of the switches connected to the or each output conductor is closed, wherein the width modulation of the pulses includes a component at the $N^{th}$ harmonic of the input voltage frequency which is of such an amplitude and so phased as to permit the amplitude of the output voltage system to be larger than the minimum instantaneous voltage of the input voltage system.

2. A converter according to claim 1, wherein the phase of the harmonic component is such that its peaks coincide with the peaks of the N phases of the input voltage system.

3. A converter according to claim 1 wherein N is 3 and the amplitude of the harmonic component is one quarter that of the input voltage system.

4. A direct a.c. converter having N input conductors for an N-phase a.c. input voltage system, P output conductors for carrying respective phases of a polyphase a.c. output voltage system having at least one characteristic such as frequency, amplitude, phase angle or phase displacement which is different from that of the input voltage system, where P is an odd integer greater than 2, a plurality of bidirectional switches which individually connect each input conductor to each output conductor, and a control system including timing means which produces for each output conductor a repeating sequence of mutually abutting width modulated pulses, there being N pulses in the sequence respectively allocated to the phases of the input voltage system, the control system being connected to the switches so that the pulses cause the switches to be closed in such a way that each phase of the input voltage system is connected in turn to each phase of the output voltage system and that at any given instant only one of the switches connected to each output conductor is closed, wherein the width modulation of the pulses includes a component at the $P^{th}$ harmonic of the output voltage frequency which is of such an amplitude and so phased as to permit the amplitude of the output voltage system to be larger than the minimum instantaneous voltage of the input voltage system.

5. A converter according to claim 4, wherein the phase of the harmonic of the output voltage frequency is such that its peaks coincide with the peaks of the P phases of the output voltage system.

6. A converter according to claim 4 wherein P is 3.

7. A direct a.c. converter having N input conductors for an N-phase a.c. input voltage system, where N is an odd integer greater than 2, P output conductors for carrying respective phases of a polyphase a.c. output voltage system having at least one characteristic such as frequency, amplitude, phase angle, or phase displacement which is different from that of the input voltage system, where P is an odd integer greater than 2, a plurality of bidirectional switches which individually connect each input conductor to each output conductor, and a control system including timing means which produces for each output conductor a repeating sequence of mutually abutting width modulated pulses, there being N pulses in the sequence respectively allocated to the phases of the input voltage system, the control system being connected to the switches so that the pulses cause the switches to be closed in such a way that each phase of the input voltage system is connected in turn to each phase of the output voltage system and that at any given instant only one of the switches connected to each output conductor is closed, wherein the width modulation of the pulses includes components at the $N^{th}$ harmonic of the input voltage frequency and the $P^{th}$ harmonic of the output voltage frequency, the components being of such amplitudes and so phased as to permit the amplitude of the output voltage system to be larger than the minimum instantaneous voltage of the input voltage system.

8. A converter according to claim 7, wherein the phase of the $N^{th}$ harmonic component is such that its peaks coincide with the peaks of the $N^{th}$ harmonic of the input voltage system.

9. A converter according to claim 7 wherein N is 3 and the amplitude of the $N^{th}$ harmonic component is one quarter that of the input voltage system.

10. A converter according to claim 7, wherein the phase of the $P^{th}$ harmonic of the output voltage frequency is such that its peaks coincide with the peaks of the $P^{th}$ harmonic of the output voltage system.

11. A converter according to claim 7, wherein P is 3 and the amplitude of the $P^{th}$ harmonic component is 0.192 of that of the output voltage system.

12. A method of converting an N-phase a.c. input voltage system, wherein N is an odd integer greater than 2, into an a.c. output voltage system having at least one characteristic such as frequency, amplitude, phase angle or phase displacement which is different from that of the input voltage system comprising the steps of generating each voltage of the output system by producing a repeating sequence of mutually abutting width-modulated samples of the voltages of the input system taken in turn and modified to include a component at the $N^{th}$ harmonic of the input system frequency applying said samples directly from the input system to the output system; and selecting the $N^{th}$ harmonic to have an amplitude and phase such as to permit the amplitude of the output voltage system to be larger than the minimum instantaneous voltage of the input system.

13. A method according to claim 12 in which the output voltage system has P phases, where P is an odd integer greater than 2, wherein the width modulation of the samples also includes a component at the $P^{th}$ harmonic of the output system frequency which is of such amplitude and phase as to permit the amplitude of the output voltage system to be larger than it could be if the component were absent.

* * * * *